A. B. SCOTT.
DEVICE FOR RECOVERING TOOLS FROM WELLS.
APPLICATION FILED APR. 14, 1919.

1,315,581.

Patented Sept. 9, 1919.

INVENTOR:—
Augustus B. Scott
BY
Frank P. Shepard.
ATTORNEY

UNITED STATES PATENT OFFICE.

AUGUSTUS B. SCOTT, OF BURKBURNETT, TEXAS.

DEVICE FOR RECOVERING TOOLS FROM WELLS.

1,315,581.            Specification of Letters Patent.     Patented Sept. 9, 1919.

Application filed April 14, 1919. Serial No. 290,062.

*To all whom it may concern:*

Be it known that I, AUGUSTUS B. SCOTT, a citizen of the United States, residing at Burkburnett, in the county of Wichita and State of Texas, have invented certain Improvements in Devices for Recovering Tools from Wells, of which the following is a specification, reference being had to the accompanying drawings.

The object of the invention is to provide a device which can be made to take hold of drill-bits, tools, and other objects which may be lost in a well and lift said objects out.

The drawings show one embodiment of the invention in practical form.

All figures are on the same scale, and like characters of reference designate like parts in all of them.

Figure 1:
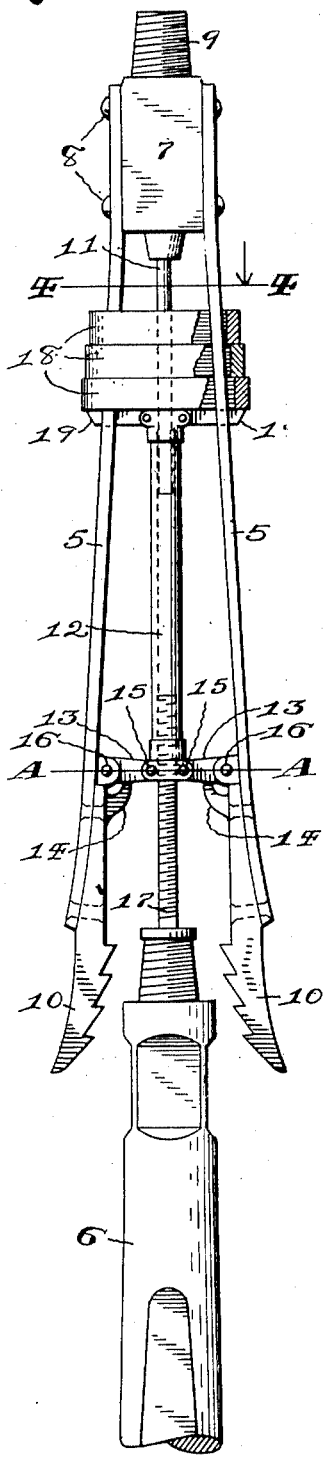
Figure 1 is an elevation view showing the device set for use.

The device includes a forked tool which in this instance has two depending prongs 5, and these prongs are arranged to close forcibly together at their lower ends by their own elasticity to take a firm hold on a drill-bit 6 or other object over which they may be slipped.

In a device which the inventor has built and used, a head-block 7 is provided to form the upper or crotch portion of the forked tool, and the depending prongs 5 are secured to said head-block by rivets 8; the upper end of the head-block being provided with a screwthreaded stem 9 so that it may be screwed into a drill-stem and controlled thereby.

The lower ends of the prongs 5 may be shaped or arranged in any manner best adapted to engage different objects in a well; and in the present instance said prongs are fitted at their lower ends with toothed jaws adapted to take a biting hold on the object.

In providing releasable means for holding the prongs 5 and their jaws 10 apart, a central guiding stem 11 depends from the head-block 7 and a sleeve 12 slidably embraces the lower end of this stem.

The lower end of this sleeve 12 is operatively connected to the two prongs 5 by links 13 which are pivoted to said sleeve and prongs as shown.

Arms 14 for limiting the downward swinging movement of the links 13 are provided and in this instance are cast integrally with the jaws 10; the arms being arranged to allow the pivotal points 15 of said links and the sleeve 12 to move down just to or slightly past the dead-center line A—A which passes through the pivotal points 16 of said links and the prongs 5.

Figure 2:
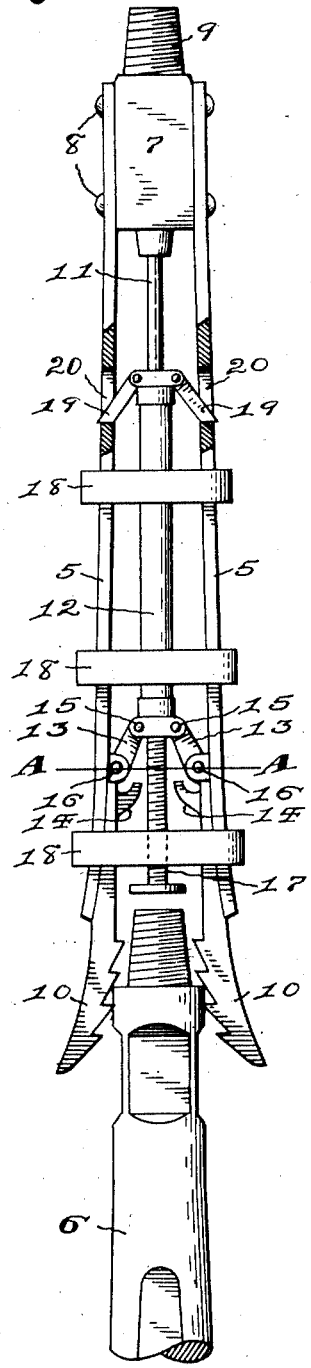
Fig. 2 is a similar view showing the device after it has been tripped and has engaged a drill-bit.
Figure 3:
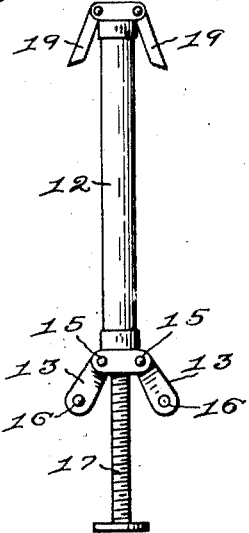
Fig. 3 is a similar view showing an assemblage of a portion of the device.
Figure 4:
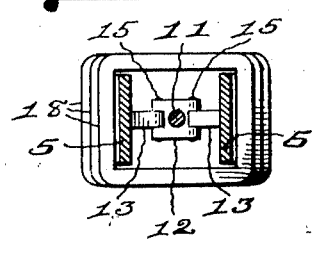
Fig. 4 is a sectional view taken on the line 4—4 of Fig. 1, with no parts shown below the line A—A of said figure.

It will be seen that when the sleeve 12 and its links 13 are swung down to or slightly past the dead-center position shown in Fig. 1 the prongs 5 and jaws 10 are positively held open; but when the sleeve is raised upward slightly, as by contact of its depending "feeler" extension 17 with the drill-bit 6 or other object to be grabbed, the links cease to act as a brace to hold the prongs and jaws open, but flip themselves and the sleeve upward to the tripped position shown in Fig. 2 in obedience to the elastic force of said prongs, the jaws engaging the drill-bit as shown.

The extension 17 of the sleeve 12 may be screwthreaded to said sleeve as shown, as necessary for a sooner or later tripping of the prongs and jaws.

In order that the prongs 5 and jaws 10 shall grip the drill-bit 6 or other object more tightly and securely than by the mere elastic force of said prongs, a ring or series of rings 18 collectively embrace the two prongs in the position shown in Fig. 1, and when the lower ends of the prongs swing together into engagement with the drill-bit said rings drop down along the diverging prongs and wedge them in more forcible engagement with said drill-bit.

In order that the rings 18 may be allowed to drop a considerable distance and thereby wedge more tightly on the diverging prongs 5, said rings are supported well toward the upper end of said prongs by holding devices which are releasable by and upon the release of the mechanism which holds the prongs and jaws 10 in open or set position.

In arranging the supporting devices, a pair of tongues 19 is pivoted to the upper end of the sleeve 12, one of the tongues extending out slidably through a vertical slot 20 in one of the prongs 5 and the other tongue likewise through a similar slot 20 in the other prong.

With the sleeve 12 drawn down to the set position shown in Fig. 1, the outer free ends of the tongues 19 rest on the lower ends of the slots 20 and project out through the rings 18 far enough to support the rings 18 as shown.

When the sleeve 12 is lifted upward by the tripping movement described, it draws the supporting tongues 19 inward and allows the rings 18 to drop.

The following is claimed:

1. A tool including a plurality of depending prongs tending to close toward a common central vertical line, a central member movable along said line, each prong being operatively connected to said member by a pivoted link, said member being adapted to be brought downward along said line to dead-center the links and thereby hold the prongs apart.

2. A tool including a plurality of depending prongs tending to close toward a common central vertical line, a central member movable along said line, each prong being operatively connected to said member by a pivoted link, said member being adapted to be brought downward along said line to dead-center the links and thereby hold the prongs apart, and means carried by the prongs to limit the downward swinging movement of the links.

3. A tool including a plurality of depending prongs tending to close toward a common central vertical line, a depending central stem structurally connected to the prongs, a member slidably embracing the stem, each prong being operatively connected to said stem by a pivoted link, and means carried by the prongs to limit the downward swinging movement of the links at a predetermined point.

4. A tool including a support, a plurality of prongs depending from the support and tending to close toward a common central vertical line, a guiding stem depending from the support along said line, a member slidably embracing the stem, each prong being operatively connected to said member by a pivoted link, the member being adapted to be brought downward on said stem to dead-center the links and hold the prongs apart, the links being adapted to be tripped from dead-center by contact of the member with the object to be recovered and thereby allow the prongs to close.

Witness my hand this 12th day of March, 1919.

AUGUSTUS B. SCOTT.